Nov. 10, 1953  N. I. PAULSEN  2,658,662
MOISTUREPROOF CONTAINER
Original Filed Nov. 23, 1945  4 Sheets-Sheet 1

Inventor
NEAL I. PAULSEN
By A. Whiteley
Attorney

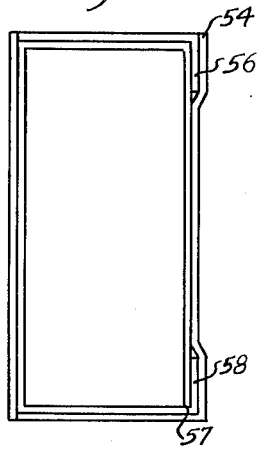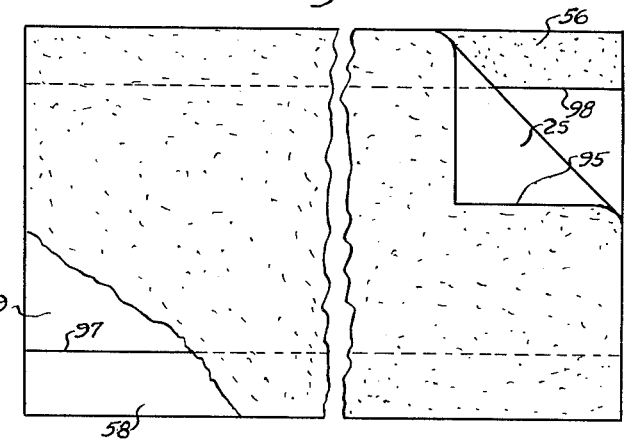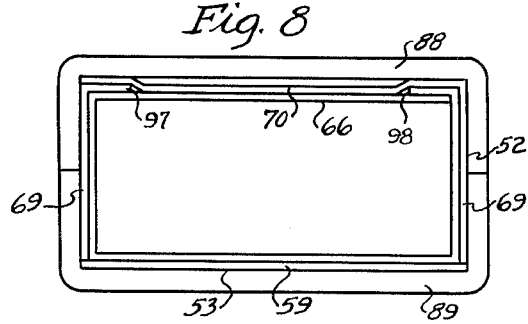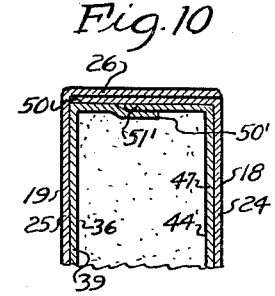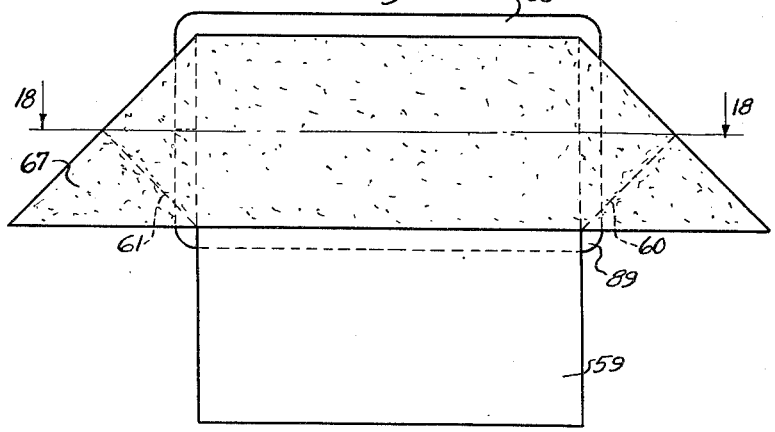

Nov. 10, 1953 N. I. PAULSEN 2,658,662
MOISTUREPROOF CONTAINER
Original Filed Nov. 23, 1945 4 Sheets-Sheet 3
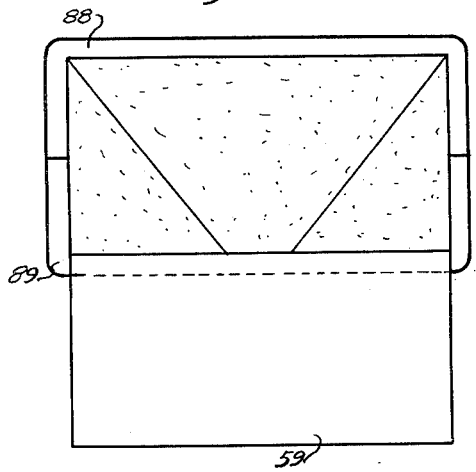
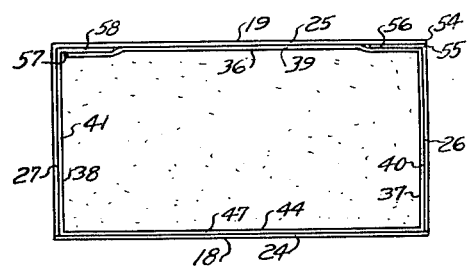
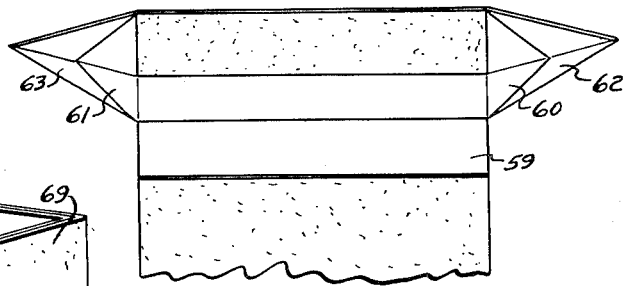
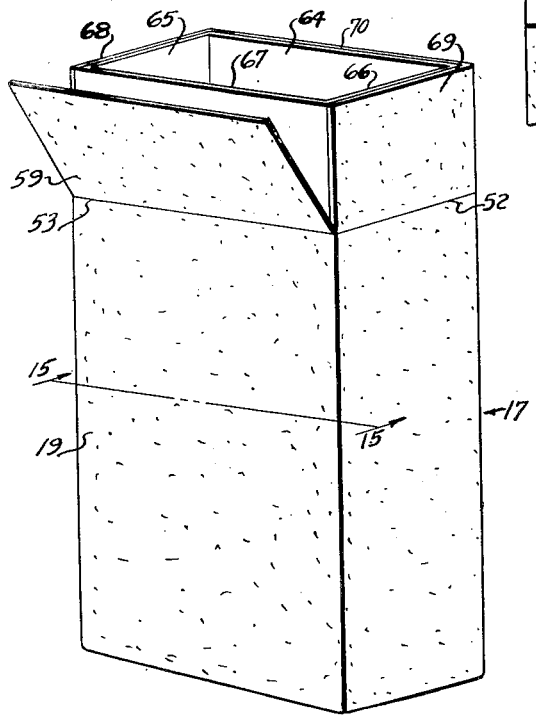
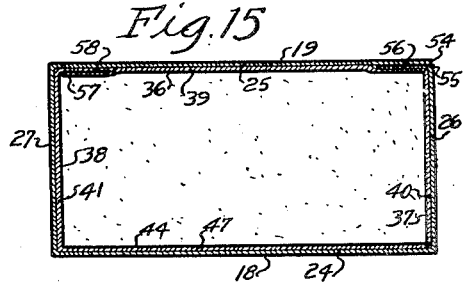
Inventor
NEAL I. PAULSEN
By
Attorney Nov. 10, 1953     N. I. PAULSEN     2,658,662
MOISTUREPROOF CONTAINER
Original Filed Nov. 23, 1945     4 Sheets-Sheet 4
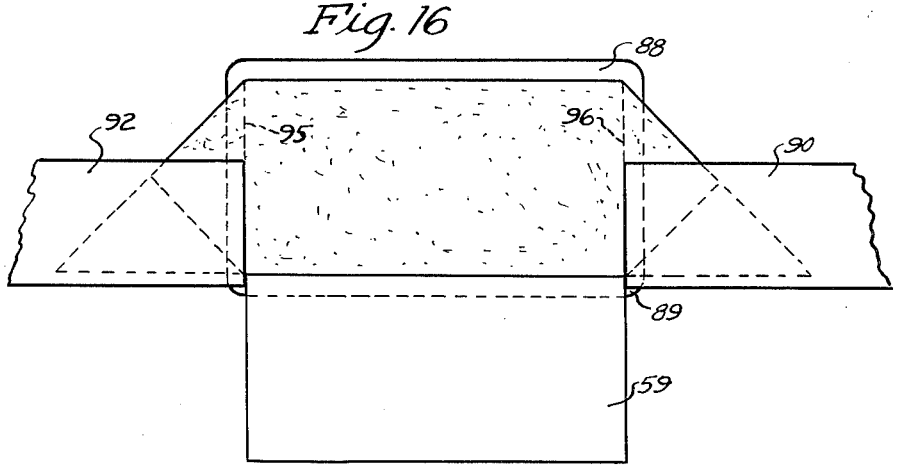
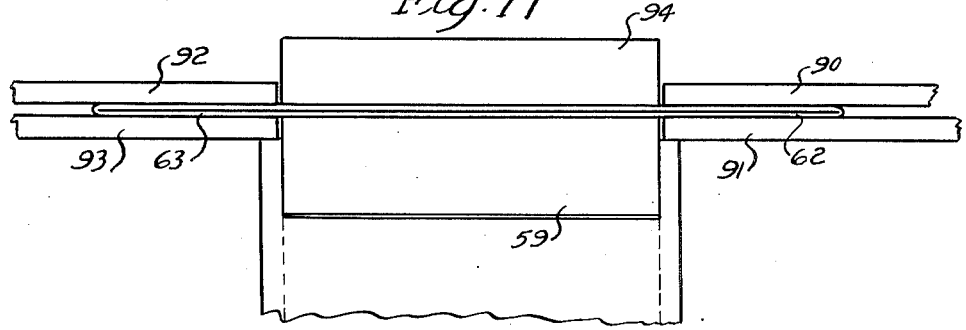
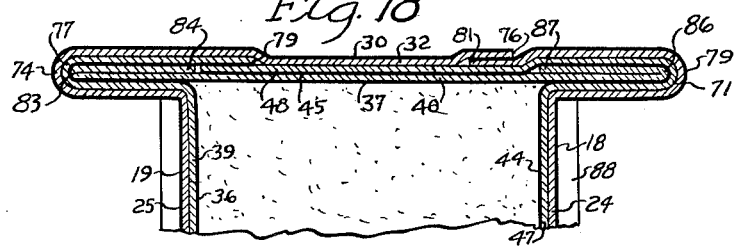
Inventor
NEAL I. PAULSEN
Attorney Patented Nov. 10, 1953

2,658,662

UNITED STATES PATENT OFFICE 2,658,662

MOISTUREPROOF CONTAINER

Neal I. Paulsen, Minneapolis, Minn., assignor to Reynolds Metals Company, Richmond, Va., a corporation of Delaware Original application November 23, 1945, Serial No. 630,224. Divided and this application August 6, 1947, Serial No. 766,561

5 Claims. (Cl. 229—37)

My invention relates to a moisture-proof container, having an inside-and-outside covering of moisture-impervious material, and in which heat sealing means is employed between the layers of such material for completely sealing the goods therein.

One form of moisture impervious material is metal foil, and heretofore it has been the practice to use very thin metal foil, such as tin foil and aluminum foil in the formation of containers for various products, specifically food products, but generally this has been done by employing a single layer over one set of surfaces of the container, specifically to cover the outer walls of cardboard containers with such metal foil, in which the cardboard forms the body of the container and gives it its rigidity and strength.

Food products requiring protection are cereal foods, milk powder, egg powder and the like. Such products rapidly deteriorate from absorption of moisture. It is customary and desirable to put cereal foods in containers adapted to hold a serving for one person. In this practice, such contents of the containers may be retained there for extended periods of time, up to several months or even a year or more, before they are eaten. When moisture has been absorbed to any substantial degree, the quality and good eating characteristics of these cereal foods are seriously deteriorated, often to a point where they cannot be eaten at all.

A container having one of its surfaces covered by a single layer of foil is not completely effective for several reasons. Among these are, the foil is made in very thin gauges for container purposes and invariably has pin holes through the body of the foil. This lets infiltration of moisture-containing air into the container and unfavorably affects its contents. Again, with this type of container, the joints of the metal foil along the sides and particularly at the ends of the container, even where heat sealing is employed, frequently are not tight and allow leakage of moisture-carrying air to the interior of the container.

In this former practice, the metal foil itself does not permit passage of moisture. The openings through it and about its joints, particularly those formed in the end closure after filling the container, however, let moisture-containing air contact the non-foil parts of the body of the container and in turn contact and be absorbed by the food contents of the container.

I have discovered that a container having thin moisture-impervious material, such as metal foil, applied to its outside and inside surfaces and heat-sealed together through the medium of an intervening layer or layers of wax-carrying materials, eliminates passage of moisture-containing air through pin holes in the metal foil or other material.

Further, that this material may be so folded in relation to the heat-sealing material that there can be sealing of all joints with double layers of sealed moisture-impervious material such that not only will the leak openings which permit moisture-carrying air to filter through to the contents of the container be effectively closed, but such an arrangement also provides walls of the container having sufficient stiffness and strength to form this container employing no other stiffening means than the metal foil and its heat-sealing backing of heat-sealing material.

Also, I have discovered that this material can be placed in the form of a thickness of wax-impregnated paper with the foil applied directly thereto and held thereby, the two layers of such wax-impregnated paper acting as a filler and stiffener between the two layers of foil or other moisture-impervious material, such as specially prepared paper, plastic sheets and the like. These two layers, after heat is applied, at the same time are caused to adhere to each other and to seal the two sheets of foil together so as to form integrated and laminated walls of the container of sufficient stiffness and strength to need no other reinforcing. Or a separate thickness of wax-impregnated paper may have the foil applied directly to it and the foil be caused by heat-sealing to adhere to said central body of sealing material. In either case, I have found a way of folding the layers of end material, after the open-ended container is filled, in connection with heat-sealing material which entirely eliminates joint leakage.

It is a principal object of my invention to provide a container having all the outsides and insides of all its walls formed of moisture-impervious material such as metal foil, the layers of such metal foil being heat-sealed together.

It is a further object of my invention to have the container formed with the outsides and insides of all its wall wholly covered by layers of metal foil or other similar pliable material and with a body of heat-sealing material between said layers of metal foil acting to seal the layers forming said walls to produce integral wall portions of the container.

It is a further object of my invention to provide a container formed with outer and inner layers of moisture-impervious material such as metal foil upon the inside and outside surfaces of the container, and, by using a heat-sealing material between the layers of moisture-impervious material and heat-sealing the layers thereof thereto, to produce a container having wall structures which have rigidity and strength sufficient to comprise the entire substance of the container walls and of the container, without the use of other reinforcing or stiffening material.

It is a further object of my invention to provide a container wherein the respective wall layers of foil are offset one from the other and heat-sealing material extends as a facing over those parts of foil layers which do not face corresponding parts of other foil layers and in which there are folded ends to the container having the parts thereof heat-sealed against foil over the entire areas of each said end of the container.

It is a further object of my invention to produce an open-ended container, prior to the filling thereof with the material going into and being protected by the container, wherein the layers of moisture-impervious material covering the inside and outside surfaces thereof have portions extending beyond the body part of the container where the layers of such material have been heat sealed together, and to provide means whereby in closing the open end of said container these extended portions may be heat-sealed together and a complete closure formed which is free from any joint leakage.

This application is a division of my application Ser. No. 630,224, filed November 23, 1945, now Patent No. 2,603,046 granted July 15, 1952.

The full objects and advantages of my invention will more fully appear in the detailed description thereof given in the appended specification, and the novel features which produce the aforementioned advantageous and useful results will be particularly pointed out in the claims.

While metal foil such as aluminum foil, tin foil or the like, is a satisfactory material in the construction of my package for most uses, and in the following specification and claims I have, for convenience, usually referred to the body material as foil or metal foil, I do not wish to limit myself to foil or metal foil therein, as it is obvious that any other material of a thin and flexible type, which is suitable to produce a heat-sealed, closed container without other stiffening means than the body material and the heat-sealing applied thereto, is available for the production of my container and is within the scope of my invention.

In the drawings, illustrating an application of my invention in some of its forms:

Fig. 6 shows the end of the container open to receive material.

Fig. 7 illustrates in plan view a side view of the container formed as a rectangular tube with certain portions turned down or removed to show the form of sealing and union of contacting portions of the two layers.

Fig. 8 is a top plan view illustrating the container tube in a heat-sealing form with the end open and the upper extension of the material unfolded.

Fig. 9 is a top plan view similar to Fig. 8 with the tabs extended holding the parts in position for heat-sealing without other support.

Fig. 10 is a sectional view across an end wall of the container as shown in Fig. 2, with the combined layers of foil and heat-sealing material at the inside of the container overlapping less than the full distance across the container.

Fig. 11 is a top plan view similar to Fig. 8 with the final sealing flap extended outwardly, and triangular tabs folded in.

Fig. 12 is a part perspective view of the container after the bottom wall has been sealed and the two side and two end walls have been heat-sealed to the point of junction with the extended unsealed parts of the container, which will be the top of the container when it is filled and the top end sealed.

Fig. 13 is a top plan view of the open ended container before filling shown in Fig. 12 and with unfolded parts in contacting position.

Fig. 14 shows the partially folded arrangement with the inner and outer triangular tabs exposed to view.

Fig. 15 is a transverse sectional view taken on line 15—15 of Fig. 12.

Fig. 16 is a top plan view of the container as shown in Fig. 9 with the clamping members gripping the extended ends of the triangular folds.

Fig. 17 is a side elevation view of the container in the position of Fig. 15 with the tab flaps turned out, the triangular tabs gripped by puller members and a heat block upon the top of contacting tab members for completely heat-sealing them.

Fig. 18 is a sectional view taken on line 18—18 of Fig. 9.

Fig. 19 is a top plan view showing the package as it has been completed.

Figure 4:
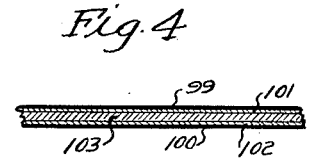
Fig. 4 is a sectional view taken through a part of one of the side or end walls of the container, exaggerated as to size in order to show the parts, and giving one form of arrangement of the parts in a container embodying my invention.

The blank from which the container is formed comprises two sheets of material that are initially independent of each other with a heat sealable layer between the two sheets. In the disclosure of Fig. 4, the heat sealable layer is independent of the sheets, while in Fig. 5 the heat sealable layers, of which there are two, are united with one side of each of the sheets. When the blank is formed the two sheets are longitudinally offset with relation to each other so as to expose a heat sealable layer on the opposite side of each end of the blank for forming the joints shown in Figs. 6 and 7. The two sheets may be of the same size in both dimensions to form a container of the type shown in Fig. 2, or the inner sheet may be somewhat narrower than the outer sheet to form a container of the type shown in Fig. 10. Before assembling the blank, the sheet which is intended to form the outer covering has a pair of oppositely disposed flaps formed in its lateral edges between its opposite ends. These flaps, one of which is shown at 59, form the final sealing surface on the top and bottom of the carton. After the sheets have been cut and the flaps formed by cutting the outer sheet to the shoulder line indicated at 52, 53 in Fig. 12, they are assembled in a longitudinally offset relationship with the heat sealable material between the sheets and exposed on opposite sides of the blank at each end, and the sheets are spot welded together to hold them in proper relationship to each other. Then, as will be explained hereinafter, the blank is folded on its longest dimension with the exposed heat sealable material at each end forming the lateral joints 56, 58 of Figs. 13, 15. The bottom end of the carton is also folded in the same manner as the top. When this is accomplished, the four lateral sides, below the lines 52, 53, and the folded bottom are heat sealed to each other. This first heat sealing action accomplishes several things. Primarily it seals the eight surfaces forming the bottom closure with heat sealable material between each of the eight layers of sheet material. Secondly, the heat sealable material flows into each fold of the sides and bottom closure and fills any breaks in the sheets which might have occurred as a result of the folding operation. Finally it bonds the broad surfaces together filling in any imperfections in the sheets, and in addition it laminates the surfaces thereby materially adding to their strength and giving them a noticeably stiffened characteristic.

The top or bottom end closure is formed by first outwardly folding the flap so as to have this part out of the way. Then the end edges are pulled outwardly as shown in Fig. 14, which action tends to bring the inner surface which was adjacent the flap over the center of the open end, and as this part is united to the latter edges, the latter takes on the form of outwardly projecting ears. This part of the closure is folded flat over the open end of the container, leaving an upwardly exposed heat sealable surface. The side opposite this portion, which constitutes parts of both the inner and outer sheets are then folded down in the direction of the flap. An intermediate heat sealing operation occurs at this point to securely bond the surfaces. This action causes a double folding of the ears of the inner sheet and the disposition of a layer of heat sealable material between each major layer of sheet material. The positioning of the parts at this stage is shown in Figs. 16 and 18. Then the ears are inwardly folded to the position of Fig. 11. Finally, the flap is folded over the assembled folded closure, and the flap is also heat sealed in place to completely bond the folds which it encloses.

Referring now to the drawings, the completed container with its contents enclosed therein, comprises a rectangular package with its two sides, two ends and top and bottom walls all parallel. In the sectional views of Figs. 2–5 and other sections, the moisture-impervious material such as metal foil, is shown by heavy black lines and the backing of this moisture-impervious material, which latter, for convenience, will be referred to as foil, it being understood that any other moisture-impervious material used in the same manner is within the scope of my invention, will be shown by ordinary block hatching. All of these sectional views of Figs. 2, 5, 10 and 18 are very greatly exaggerated in size to show the relation of the parts comprising the package.

The straight end views, such as Figs. 6, 8, 13 and 14, likewise show the foil by heavy black lines and give exaggerated thickness views of the edges of the parts extended beyond the body of the package, again for showing more clearly the relation of these parts.

The face views of metal foil, as in Figs. 1, 7, 13, 15 and 17 are shown stippled indicating metal foil exposed to the outside of the package or on parts which are exposed inside and elsewhere.

Figure 2:
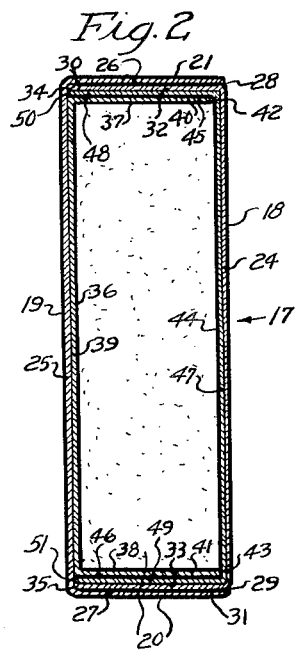
Fig. 2 is a transverse sectional elevation view taken on line 2—2 of Fig. 1, with sections of layers forming the container exaggerated in size to show their relations one to another.

In Fig. 2, which illustrates a preferred form of my invention, the container indicated generally by the arrow from the numeral 17, has the outsides of its side walls covered by layers of foil 18 and 19. The outsides of its end walls are covered by layers of foil 20 and 21, which are the outsides of the top and bottom walls.

It will be noted, as shown in Fig. 2, that layer of foil 18 is adhered to a heat-sealing carrying portion 24, side layer of foil 19 is adhered to a heat-sealing carrying portion 25, that top layer of foil 21 is adhered to a heat-sealing carrying portion 26 and bottom layer 20 is adhered to a heat-sealing carrying portion 27.

The outside foil coverings 20 and 21 and the heat-sealing backings for it 26 and 27 are continuous across the top and bottom walls of the package, with foil covering 19 and heat-sealing backing 25, and this double layer terminates respectively at 28 and 29 on the opposite side of the package.

Likewise, foil layer 18 continues in foil layer 30 across the top wall, and in foil layer 31 across the other end wall, while heat-sealing backing 24 continues as heat-sealing backing 32 across bottom wall and as heat-sealing backing 33 across the other end wall. These double layers terminate respectively at 34 and 35.

Referring further to Fig. 2, a precisely similar arrangement in cross-sectional drawing across the center of the package is shown for the inside of the package. Here a layer of foil 36 across one side wall continues into layers of foil 37 and 38 across the top and bottom walls respectively.

The heat-sealing backing 39 for foil layer 36 likewise extends across the top and bottom in heat-sealing backing layers 40 and 41 terminating at 42 and 43 respectively. Across the other side wall is a layer of foil 44, which extends into layers of foil 45 and 46 across the top and bottom. Likewise, the heat-sealing backing 47 for foil layer 44 continues as heat-sealing backing layers 48 and 49, and the combined foil and heat-sealing backing layers 45, 48 and 46, 49 terminate respectively at 50 and 51.

In the above arrangement, the respective combined layers 37, 40 and 45, 48, across one end wall, and 38, 41 and 46, 49 across the other end wall extend the full distance across the respective end walls. A modification illustrated in Fig. 10, shows these sets of double layers at the inside walls do not overlap the entire distance from side wall to side wall as in Fig. 2, but terminating at 50' and 51' respectively with only a small overlap as there indicated. This has an advantage in the saving of material, important in making the containers in quantity at a tolerable cost.

Figure 3:
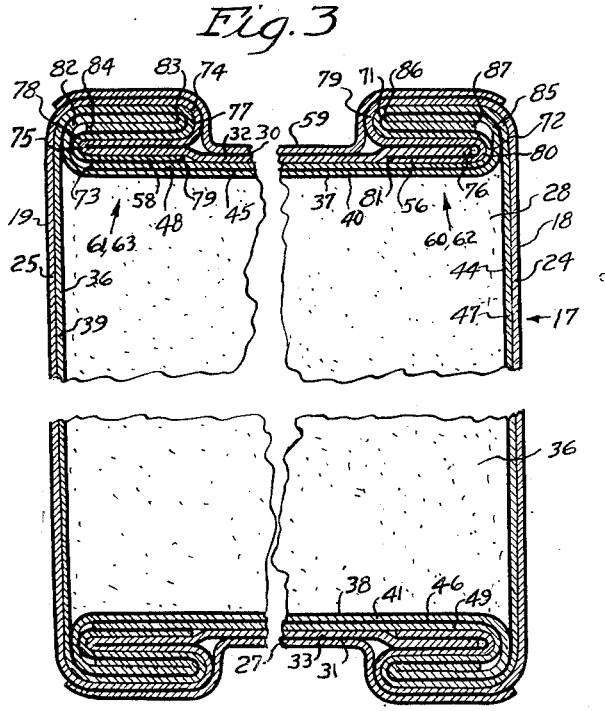
Fig. 3 is a sectional longitudinal view of the container taken on line 3—3 of Fig. 1, with sections of layers forming the container exaggerated in size to show their relations one to another.

Having reference to Figs. 1, 3, 11 and 16, the very important construction by which the ends of the container are sealed will now be described. The showing of these ends on Fig. 3 is very greatly exaggerated as to size. The actual appearance of the upper end of the closed container is well shown in Fig. 19, in which the sealed end has a substantially plane surface with only a slight depression where the tabs are folded and are covered by a top flap.

There is no serious problem about heat-sealing the bottom of the container since a heating member former may be introduced within the container and heat-sealing effected by pressure, with heat applied directly, upon the bottom wall rested upon some firm surface, just as, in a similar manner, the two side walls and two end walls of the container are heat-sealed up to the plane of the top of the container before the top has been closed and heat-sealed.

This results in the production of a container having what may be called its top end open to permit introduction of a perishable product into the body of the container or the space bounded by the heat-sealed bottom, side and end walls.

A problem of primary great importance and difficulty, is found in heat-sealing this open end of the container after its body chamber has been filled. The extreme difficulty of this problem comes from the fact that obviously no former or other supporting means can be introduced into the inside of the container after it is filled, and yet that there must be complete heat-sealing of this top end wall, with no leaks through for admission of water-carrying air, in order that the whole purpose of my invention and container, to provide a completely closed moisture-impervious container, be fulfilled. For tests have shown that even a very small air passage through from outside to inside of the container will defeat that purpose.

The open-ended container, before it is sealed and while in condition to be filled with whatever product is to be held therein, is shown in Figs. 12 and 13. In this arrangement the foil covered end walls 20 and 21 and side walls 18 and 19 have the various layers forming these walls heat-sealed together into integrated laminated structures to the top of the body of the container indicated at 52 and 53 in Fig. 12.

Having reference to Figs. 12 and 13, there are extended portions of the side walls and end walls above these lines 52 and 53 which are structurally similar in arrangement of layers to what is shown in transverse sections at the ends of the container shown in Fig. 2 and at the central longitudinal end sections of what is shown in Fig. 3.

Referring first to the sectional view of Fig. 15, it will be noted that the outer layer of combined foil 18 and 19 and heat-sealing backing 24, 25 extends from the corner 54 of the casing along side 19, end 27, side 18, end 26, to an angle at 55 which is below the point of starting 54, where a short flap 56 turns inwardly and comes between the outer layer 19, 25 and the inner layer 36, 39.

This inner layer starts at 57 and continues through side layers 36, 39 under flap 56 where the heat-sealing layer 39 contacts it, thence through end inner layer 37, 40, through the other side layer 44, 47, through the other inside end layer 38, 41, past the end 57 and into a flap 58 which overlies the first part of layer 36, 39.

It also appears clear from Figs. 12, 13 and 15 that metal foil of inner flap 58 is turned inwardly, where it contacts heat-sealing material of the inner side wall portion 36, 39, while inner flap 56 has its foil surface turned outwardly where it contacts heat-sealing surface of the outside side layer 19, 25.

It follows from the above, and when the bottom wall is heat-sealed, that the side and end walls and bottom wall are heat-sealed together everywhere with foil upon all the insides of the inside walls, and with foil everywhere upon all the outsides of the outside walls up to the plane of the free top flap upward extensions indicated at 52 and 53.

The means of producing a heat-sealing of the bottom wall, by the folding arrangement which will now be described, can and does easily and certainly effect complete heat-sealing. That same folding arrangement makes possible complete heat-sealing of the top wall, even though there can be no underlying support while the heat-sealing form is applied thereto.

This folding arrangement is particularly well shown in Fig. 3 and also the manner in which it is obtained is shown in Figs. 9, 11, 14 and 18.

As shown in Fig. 7, before any folding has been done, a tube or a hollow member rectangular in cross-section has been formed. As heretofore pointed out and as shown in Fig. 6, this tube is made up of an inner layer of combined foil and heat-sealing material which extends from the point 57 about all of the inner walls of the container, with the flap 58, indicated in dotted lines and under broken-away portion, Fig. 7, as ending at 97. This arrangement has the foil layer extending throughout the inside of the tube and has flap 58 facing a heat-sealing layer 39 with foil throughout the length of the flap.

Similarly the outside layer extends from the point 54 all the way around the outside of the tube to end in the flap 56, which has its foil surface underlying the heat-sealing layer 25 at the beginning of the outside combined foil and heat-sealing material. This extends to the point indicated at 98 at the turned back portion of Fig. 7, and shows the flap 56 as having its foil surface extending outwardly to be engaged by the heat-sealing part 25 of the portion of the outer layer which overlies the foil surface of flap 56.

Figure 1:
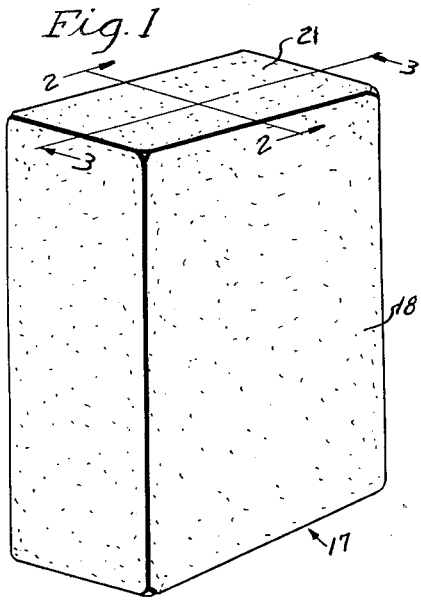
Fig. 1 illustrates a perspective view of my container completely sealed.

Referring to Figs. 11, 12, 14 and 16, it will be noted that there is a flap 59, which is entirely free at its outer edges, and which is shown turned outwardly with the heat-sealing surface up in Fig. 11. This flap 59 is shown also in Fig. 3 where it is turned over the upper end of the container and completes the top wall 21 as shown in Fig. 1.

Referring to Fig. 14 the first set of folds gives triangular inner tabs 60 and 61. The second set of folds gives triangular outer folds 62 and 63. The inner folds 60 and 61 are made up entirely of the inner extended flap portions indicated in Fig. 12, which are free, rectangular extensions of the walls of the body of the container designated as 64, 65, 66 and 67.

The outer folds 62 and 63 are made up entirely of the extended outer end flaps 68 and 69 and the interconnected side extension 70 as shown in Fig. 12. The outer flap 59, as clearly shown in Fig. 12, does not enter into any of the triangular tab folds, but overlies all of them to finish the package as clearly indicated in Fig. 19.

Continuity of the folds of the respective end layers 18—24 and 19—25 and the manner in which complete sealing of the ends of the container takes place is well shown by the size-exaggerated sectional drawing of Figs. 3 and 18. Thus, inner layer 44—47 makes a loop at 71, makes a second loop at 72 and continues across the top wall to a point adjacent the end wall where it ends at 73. Correspondingly outer layer 19—25 makes a loop at 74, a second loop at 75 and continues across the top wall of the container to its ending point at 76 adjacent the other end wall of the container.

The inside wall 36—39 makes a loop at 77 and a second sharp loop at 78 and extends to its terminal point 79. It will be noted that at this point the end 79 of the inside layer 36—39 has its foil surface 36 extending beyond for a considerable distance the end 73 of the inner layer 44—47, and this overlap makes possible effective and complete heat-sealing across that end.

Also the outer layer 18—24 loops at 79, loops again at 80, and terminates at 81. There the metal foil 18 of said outside layer 18—24 underlies for a considerable distance the heat-sealing portion of the outside layer, terminating at 76, with the result that these overlapping portions of the outside layers are permanently heat-sealed together, thus insuring complete heat-sealing at the overlapping edges of the end outside layers.

The top inside layer 37—40 loops at 82 and again loops on itself at 83 and terminates at 84 near one end wall. Similarly at the other end wall the layer 37—40 loops at 85, loops again at 86, and terminates at 87 near the other end wall. In each of these folds the heat-sealing part 40 folds back on itself and its parts are heat-sealed together adjacent both ends. The way it does this is shown in Fig. 3, and also well shown in Fig. 18. There is thus, when the outer flap 59 is folded over to cover the tabs 60, 62 and 61, 63, complete heat-sealing effected through this folding arrangement which produces the complete and finished rectangular package of Figs. 1 and 19.

The folding at the bottom of the package is identical with the folding at the top but that need not be given in detail. The heat-sealing of the body, as heretofore noted, is very simply effected by using a heat-sealing former inside the container.

The manner of heat-sealing the top of the container with the necessary omission of a forming heated block inside is indicated in Figs. 9, 16 and 17. As shown in Fig. 8, a forming block made of parts 88 and 89 has been placed about the tube, shown in Fig. 7, wherein the folds have been made for the bottom wall, and an inside forming block has been used to heat-seal the bottom, two sides and two end walls leaving the outside flaps 59, 69 and 70 and the inside flaps 65, 66, 67 and 68 extending freely above the heat-sealed top of the body indicated at 52 and 53. This is the condition of the container when it has been filled with its contained product, and in the illustrations of Figs. 9, 16 and 17 it may be assumed that this filling has taken place.

The inner small triangles 60 and 61, Fig. 14, will be enclosed within the outer and larger triangles 62 and 63, with the free flap 59 thrown back, all as shown in Fig. 9, in which the forming block, made of members 88 and 89, remains in place and block members 90, 91 at one side and 92, 93 at the other side grip the extended triangle ends 62, 63 and pull the entire top assemblage out into substantially a horizontal plane, at which time a heat block 94 is applied to the portion of the top end between the edges 95 and 96 of the body portion of the container, Fig. 17.

This application of heat in this manner without the use of any support underneath it, because of the manner in which the triangular outwardly extended flaps are formed and are held during the heat-sealing operation, completely and effectively seals the container after being loaded with its contents.

Many of these loaded containers have been held for in excess of a year in a heated, moisture-saturated atmosphere in comparison with sealed tin cans, with the result that practically no moisture has been absorbed in the contents of the package in that long period of time and under that excessive condition. The cans were found to have absorbed as much or more moisture than my container here described.

Figure 5:
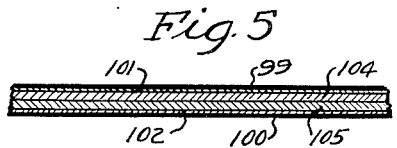
Fig. 5 is likewise a sectional view of a side wall or end wall of the container which shows a different arrangement of layers of material from that shown in Fig. 4, on an exaggerated scale to show the component parts thereof.

In place of the layers of heat-sealing material adherent to the foil layer, the arrangement may be as shown in Figs. 4 and 5. In Fig. 4, which illustrates any of the side or end walls of the container, a foil layer 99 and another foil layer 100, each with a supporting layer of tissue 101 and 102, are positioned on opposite sides of a wax-impregnated heat-sealing layer 103 and may be heat-sealed together exactly as shown in Figs. 2 and 3.

In the form shown in Fig. 5, the foil layers 99 and 100 and the supporting tissue 101 and 102 are the same as in Fig. 4, but in this form two layers 104 and 105 are used in place of the single layer 103 as in Fig. 4. In any of these variations the result is the same, in that heat-sealing effects complete moisture-impervious end, side, top and bottom walls of the container.

The advantages of my invention are quite apparent from the foregoing description. The primary and self evident great advantage resides in the fact that this is the first all rectangular flexible package or container which is as effective in protecting its contents from moisture as is a sealed metal can. A highly important part of this advantage, of my container as a whole, comes from the fact that, in its use, not only is it effective to a high degree in keeping out moisture from outside the container from dry contents in the container, but it is equally effective, where moist or wet goods, as soaked prunes for example, are enclosed in the container, in retaining the moisture of the contents within the container, which, in this use also, is of a flexible rectangular container having the moisture-protective advantages of sealed tin cans. And the all-metal foil lining of the package will retain syrupy, oily or greasy substances and the like entirely without deterioration of the container walls or unfavorable reaction on the product as effectively as will sealed tin cans.

I claim:

1. A container which is open at one end, embodying four lateral sides and an end closure consisting of prolongations of each of the sides opposite the open end, comprising a first sheet of material forming the inner surfaces of the container, a second sheet of material forming the outer surfaces of the container, said sheets overlapping on one of their dimensions to extend about and reinforce two corners of the lateral sides, the single end closure consisting of a multiplicity of folded alternately overlapping layers of the first and second sheets, the end closure prolongations of the sheets being continuous at the corners of the container except at two adjacent corners of the second sheet of material whereby a flap is formed from one side of the outer layer which constitutes the final overlap, and a layer of heat sealing material between contacting surfaces of the sides and between each contacting surface of the portions of the two sheets that form the single closure at one end of the container, said material forming a continuous bond that increases the rigidity of the container and renders all opposite contacting surfaces of the sheets forming the sides and single end closure to a practical extent air-tight and moisture-proof.

2. A container embodying four lateral sides and oppositely disposed end closures which are prolongations of each of the sides, comprising a first sheet of material forming the inner surfaces of the container, a second sheet of material forming the outer surfaces of the container, said sheets overlapping on one of their dimensions to extend about and reinforce two corners of the lateral sides, the end closures consisting of a multiplicity of folded alternately overlapping layers of the first and second sheets, the end closure prolongations of the sheets being continuous at the corners of the container except at two adjacent corners of the second sheet of material whereby a flap is formed from one side of the outer layer which constitutes the final overlap, and a layer of heat sealing material between all contacting surfaces of the lateral sides and also between each contacting surface of the portions of the two sheets that form the end closures, said material forming a continuous bond that increases the rigidity of the container and renders all opposite contacting surfaces of the sheets forming the sides and end closures to a practical extent air-tight and moisture-proof.

3. A container embodying four lateral sides and oppositely disposed end closures which are prolongations of each of the sides, comprising a first sheet of metal foil forming the inner surfaces of the container, a second sheet of metal foil forming the outer surfaces of the container, said sheets overlapping on one of their dimensions to extend about and reinforce two corners of the lateral sides, the end closures consisting of a multiplicity of folded alternately overlapping layers of the first and second sheets, the end closure prolongations of the sheets being continuous at the corners of the container except at two adjacent corners of the second sheet of material whereby a flap is formed from one side of the outer layer which constitutes the final overlap, and a layer of heat sealing material between all contacting surfaces of the lateral sides and also between each contacting surface of the portions of the two sheets that form the end closures, said material forming a continuous bond that increases the rigidity of the container and renders all opposite contacting surfaces of the sheets forming the sides and end closures to a practical extent air-tight and moisture-proof.

4. A container embodying four lateral sides and oppositely disposed end closures which are prolongations of each of the sides, comprising a first sheet of material forming the inner surfaces of the container, a second sheet of material forming the outer surfaces of the container, said sheets overlapping on one of their dimensions to extend about and reinforce two corners of the lateral sides, the end closure consisting of folded alternately overlapping layers of the first and second sheets forming two opposite sides of the container and two pair of inwardly folded triangular tabs forming the other two opposite sides of the container, the end closure prolongations of the sheets being continuous at the corners of the container except at two adjacent corners of the second sheet of material whereby a flap is formed from one side of the outer layer which constitutes a final overlap, and a layer of heat sealing material between all contacting surfaces of the lateral sides and also between each contacting surface of the portions of the two sheets that form the end closures, said material forming a continuous bond that increases the rigidity of the container and renders all opposite contacting surfaces of the two sheets forming the sides and end closures to a practical extent air-tight and moisture-proof.

5. A container embodying four lateral sides and oppositely disposed end closures which are prolongations of each of the sides, comprising a first sheet of material forming the inner surfaces of the container, a second sheet of material forming the outer surfaces of the container, said sheets overlapping on one of their dimensions to extend about and reinforce two corners of the lateral sides, the end closure consisting of folded alternately overlapping layers of the first and second sheets forming two opposite sides of the container and two pair of inwardly folded triangular tabs forming the other two opposite sides of the container, the end closure prolongations of the sheets being continuous at the corners of the container except at two adjacent corners of the second sheet of material whereby a flap is formed from one side of the outer layer which constitutes a final overlap; and two layers of heat sealing material between all contacting surfaces of the lateral sides and also between each contacting surface that exists between portions of the two sheets that form the end closures; said material forming a continuous bond that increases the rigidity of the container and renders all contacting surfaces between the two sheets forming the sides and end closures to a practical extent air-tight and moisture-proof.

NEAL I. PAULSEN.

References Cited in the file of this patent

UNITED STATES PATENTS

| Number | Name | Date |
|---|---|---|
| 481,485 | France | Aug. 23, 1892 |
| 1,135,878 | Christensen | Apr. 13, 1915 |
| 1,958,256 | Yates | May 8, 1934 |
| 1,983,520 | Charch et al. | Dec. 11, 1934 |
| 2,152,323 | Moore | Mar. 28, 1939 |
| 2,166,389 | Bergstein | July 18, 1939 |
| 2,252,462 | Howard | Aug. 12, 1941 |
| 2,293,568 | Snyder | Aug. 18, 1942 |
| 2,326,649 | Howard | Aug. 10, 1943 |
| 2,372,452 | Rohdin | Mar. 27, 1945 |
| 2,400,390 | Clunan | May 14, 1946 |
| 2,429,538 | Wood | Oct. 21, 1947 |
| 2,438,981 | Waters | Apr. 6, 1948 |
| 2,442,936 | Rohdin | June 8, 1948 |